Dec. 29, 1953 D. E. MARSHALL ET AL Re. 23,760
METHOD AND APPARATUS FOR COLD MILLING SOAP AND OTHER MATERIALS
Original Filed July 15, 1950 6 Sheets-Sheet 1
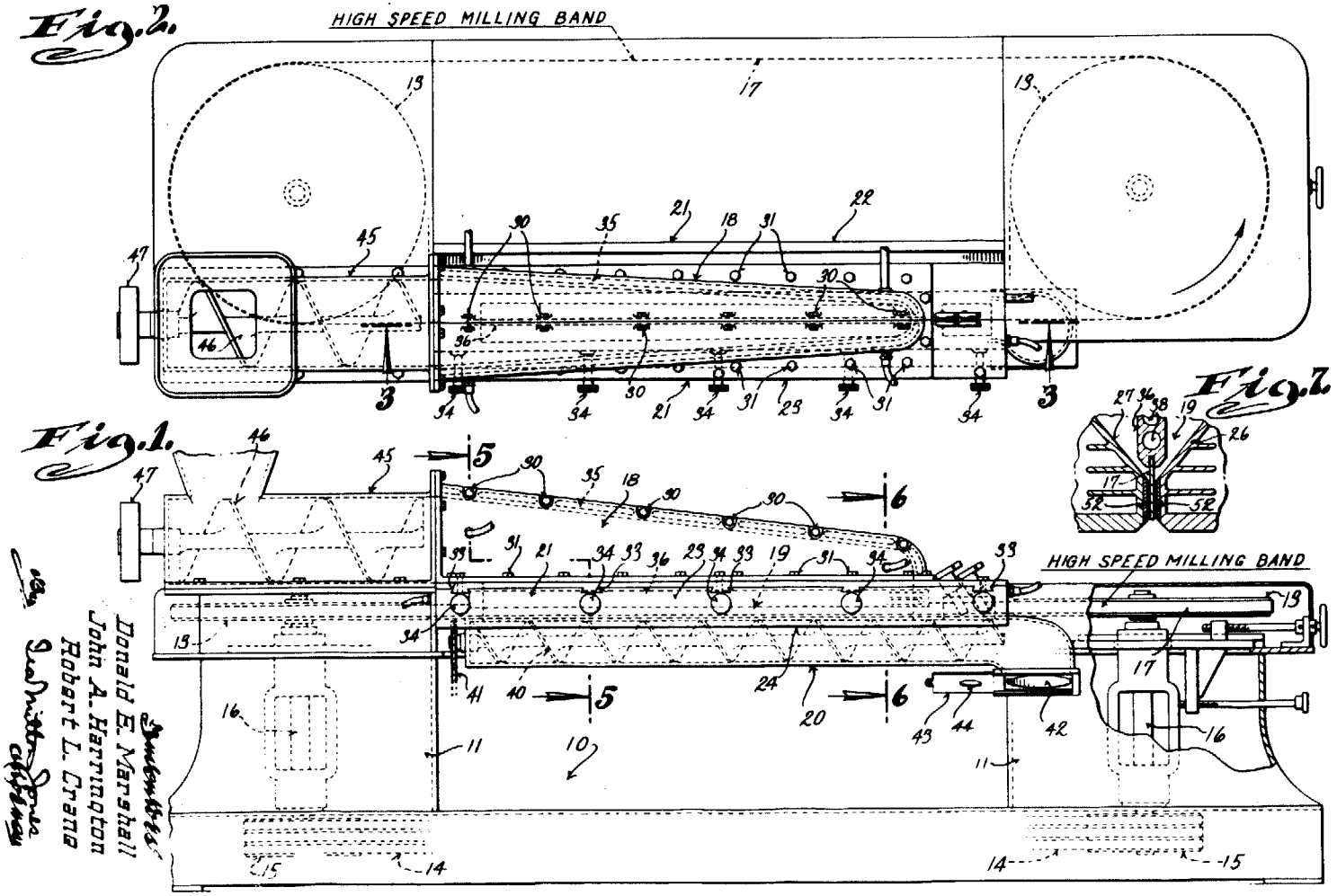
Inventors
Donald E. Marshall
John A. Harrington
Robert L. Crane
By Ira Milton Jones
Attorney HIGH SPEED MILLING BAND
Inventors
Donald E. Marshall
John A. Harrington
Robert L. Crane
by Dwight Jones
Attorney Inventors
Donald E. Marshall
John A. Harrington
Robert L. Crane
By Dwa Milton Jones
Attorney Inventors
Donald E. Marshall
John A. Harrington
Robert L. Crane
by Ira Milton Jones
Attorney Fig. 19.
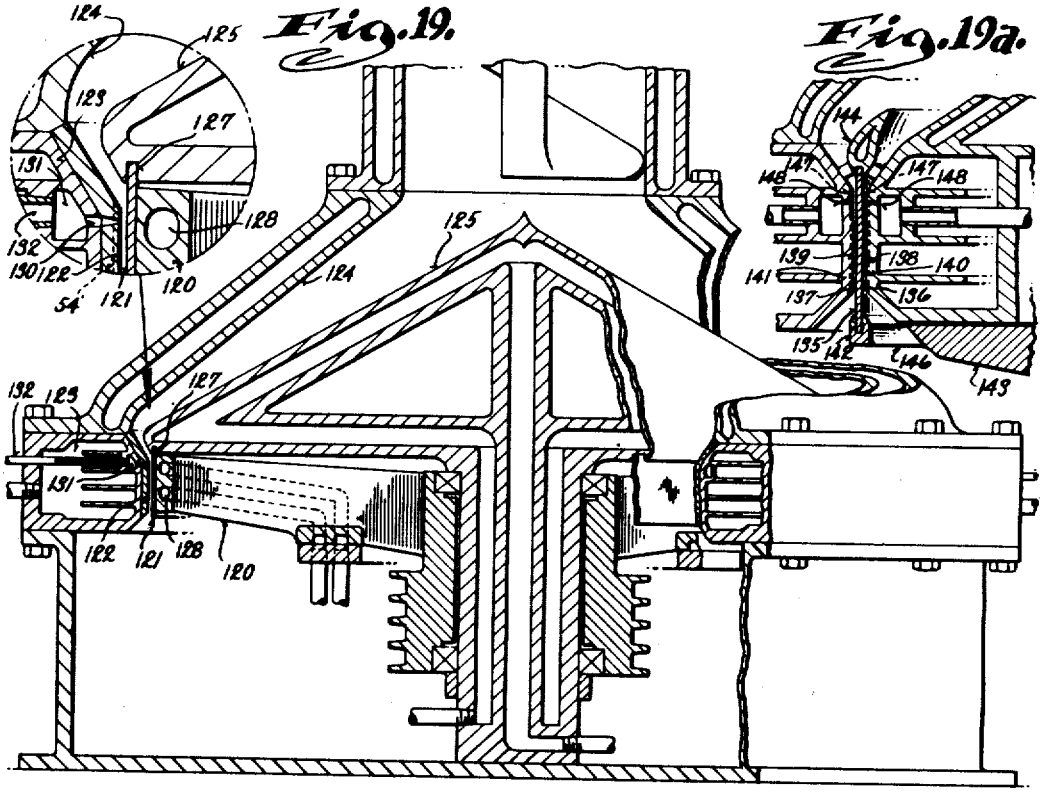
Fig. 19a.
Fig. 17.
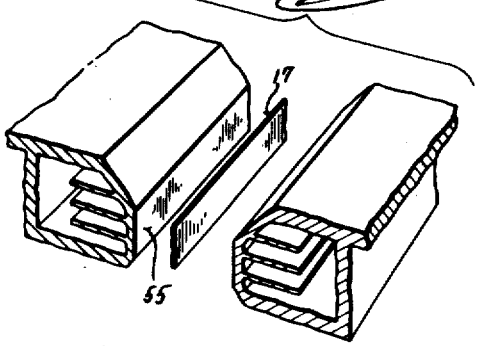
Fig. 18.
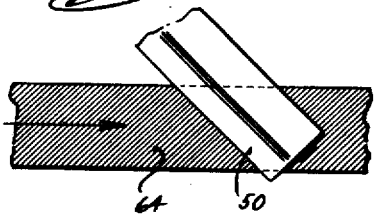
Fig. 16.
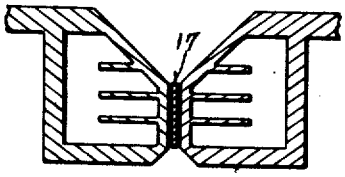
Inventors
Donald E. Marshall
John A. Harrington
Robert L. Crane
by Leo Milton Jones
Attorney Inventors
Donald E. Marshall
John A. Harrington
Robert L. Crane
by Dwight Williams Jones
Attorney Reissued Dec. 29, 1953 Re. 23,760

UNITED STATES PATENT OFFICE 23,760

METHOD AND APPARATUS FOR COLD MILLING SOAP AND OTHER MATERIALS

Donald E. Marshall and John A. Harrington, Minneapolis, and Robert L. Crane, Glen Lake, Minn., assignors to Micro Processing Equipment Inc., Des Plaines, Ill., a corporation of Illinois Original No. 2,620,511, dated December 9, 1952, Serial No. 174,084, July 15, 1950. Application for reissue October 22, 1953, Serial No. 387,825

40 Claims. (Cl. 18—1)

Matter enclosed in heavy brackets [ ] appears in the original patent but forms no part of this reissue specification; matter printed in italics indicates the additions made by reissue.

This invention relates to milling methods and apparatus and refers more particularly to the cold milling of soap. The [copending application of] Donald E. Marshall [, Serial No. 129,942, filed November 29, 1949, dealt] *Patent No. 2,619,680 deals* with the [original system in which] *technique of milling soap by passing* a high speed carrier-band [is passed] through a closely fitted milling or conversion channel. The present invention deals with several modifications of this earlier [system] *technique* which provide new degrees of effectiveness, new functions and generally extends the application of the [system] *technique* into wider fields as well as increasing [the] *its* capacity [of the system] for certain materials.

As in the [aforesaid copending application] *patent*, the purpose of this invention is to refine the physical properties of cold milled soap by subjecting the soap in its solid state to shearing and compacting forces of an entirely unprecedented intensity and to do so without developing destructive heating of the mass undergoing treatment.

Another singular aspect of this invention resides in the fact that despite the unprecedented intensity of the shearing and compacting forces to which the soap is subjected and the consequent high degree of viscosity obtained thereby, aeration, if desired, may be obtained concomitantly with the shearing and compacting.

Those skilled in the art of soap making have long recognized the desirability of high viscosity or hardness as a measure of physical refinement, since through it better appearance, finer texture and less wastefulness are obtained. Small particle size, and particle nearness referred to in the aforesaid [copending application] *patent* as an ultra-microcrystalline state, is the key to high viscosity, but no one heretofore has ever achieved these high viscosities by milling alone in a manner compatible with commercial soap production.

In 1941 Russian experimenters purportedly converted unadulterated milled soap so as to show traces of transparency and thus possess the desired small particle size, by repeated cold roller milling (about five times that given to ordinary cold milled soap); but this process is limited to moistures above twelve per cent (12%), does not aerate and has not been commercially acceptable. The only other known attainment of small particle size to the point of transparency involved the use of adulterants such as sugar solution, glycerin, resin, castor oil, etc. These adulterants added to soap in the molten state inhibit crystal formation and permit super cooling of the soap mass with particles thereof in the colloidal range (less than ½ micron).

This invention achieves its objective in a commercially practicable manner by a unique method of milling by which the unadulterated soap ranging in moisture content from five percent (5%) to seventeen percent (17%) in the solid state is subjected to an extremely fast-acting and powerful shearing and compacting force for but a brief instant so that the desired fine particle subdivision and compacting is obtained without appreciable heating of the soap. Also aeration and dispersion of the air in the soap may be accomplished during this high speed action without requiring a closed system.

Stated broadly, the method by which this invention achieves its purpose involves first forming the soap into a film-like sheet and then quickly acting upon the sheet by means of a band travelling at high speed and contacting one side of the sheet to move the surface layer at said side of the sheet relative to the surface layer at the opposite side of the sheet at a speed sufficiently great so that inertia effects fine subdividing and compacting of particles throughout the mass of material comprising the sheet.

The apparatus for carrying out this method comprises relatively movable complementary milling members having closely adjacent milling surfaces of substantial area defining therebetween a shearing and compacting zone through which the soap material to be milled passes at relatively high speed as a film-like sheet and in its passage through said zone has extremely high speed motion imparted to the surface layer at one side thereof relative to its other surface layer, and crosswise of the direction in which the sheet passes through the shearing and compacting zone.

In its preferred form the apparatus makes use of the high speed shearing effect of an endless band trained about a pair of pulleys one or both of which are driven at high speed, and which drive the band through an extremely narrow milling slot or orifice through which the material to be milled is force fed, crosswise of the band, and brought into shearing contact with both sides of the band. Not only is the band employed to shear and compact the soap, but it is also used to carry sufficient air, adhering as a film to the surfaces of the band, into the milling orifice for aeration of the soap if desired. Congestion and aeration grooves in the walls of the milling orifice may be provided to cause occlusion and dispersion in the soap of the air brought into the milling orifice by the high speed band.

As will appear more fully hereinafter, this manner of effecting shearing and compacting has a very important advantage from the standpoint of dissipation of the heat generated in the process. The extreme high speed at which the shearing action takes place minimizes the amount of heat produced, and that heat which is generated is carried away by the band and/or the walls of the milling orifice before it can have any destructive effect upon the material.

With the above and other objects in view, which will appear as the description proceeds, this invention resides in the unique method and apparatus substantially as hereinafter described, and more particularly defined by the appended claims, it being understood that such changes in the precise embodiment of the hereinafter disclosed invention may be made as come within the scope of the claims.

The accompanying drawings illustrate several examples of the physical embodiments of the invention constructed in accordance with the best modes so far devised for the practical application of the principles thereof, and in which:

Figure 1 is a side elevational view of a band converter embodying the principles of this invention;

Figure 2 is a plan view of the apparatus shown in Figure 1;

Figure 7 is an enlargement of a portion of Figure 5 showing slightly modified details of the parts in the milling zone;

Figure 16 is an enlarged cross sectional view on the order of Figure 7 but showing the use of ungrooved milling surfaces on the stationary milling elements;

Figure 17 is a fragmentary perspective view of the milling elements seen in Figure 16 but showing the same separated;

Figure 18 is a view of a modified milling band;

Figure 19 is a view partly in side elevation and partly in section illustrating a rotary milling apparatus embodying the principles of this invention;

Figure 19a is a fragmentary sectional view showing a modified version of the rotary type mill shown in Figure 19;

Figures 3, 5, 6, 8, 9, 10:
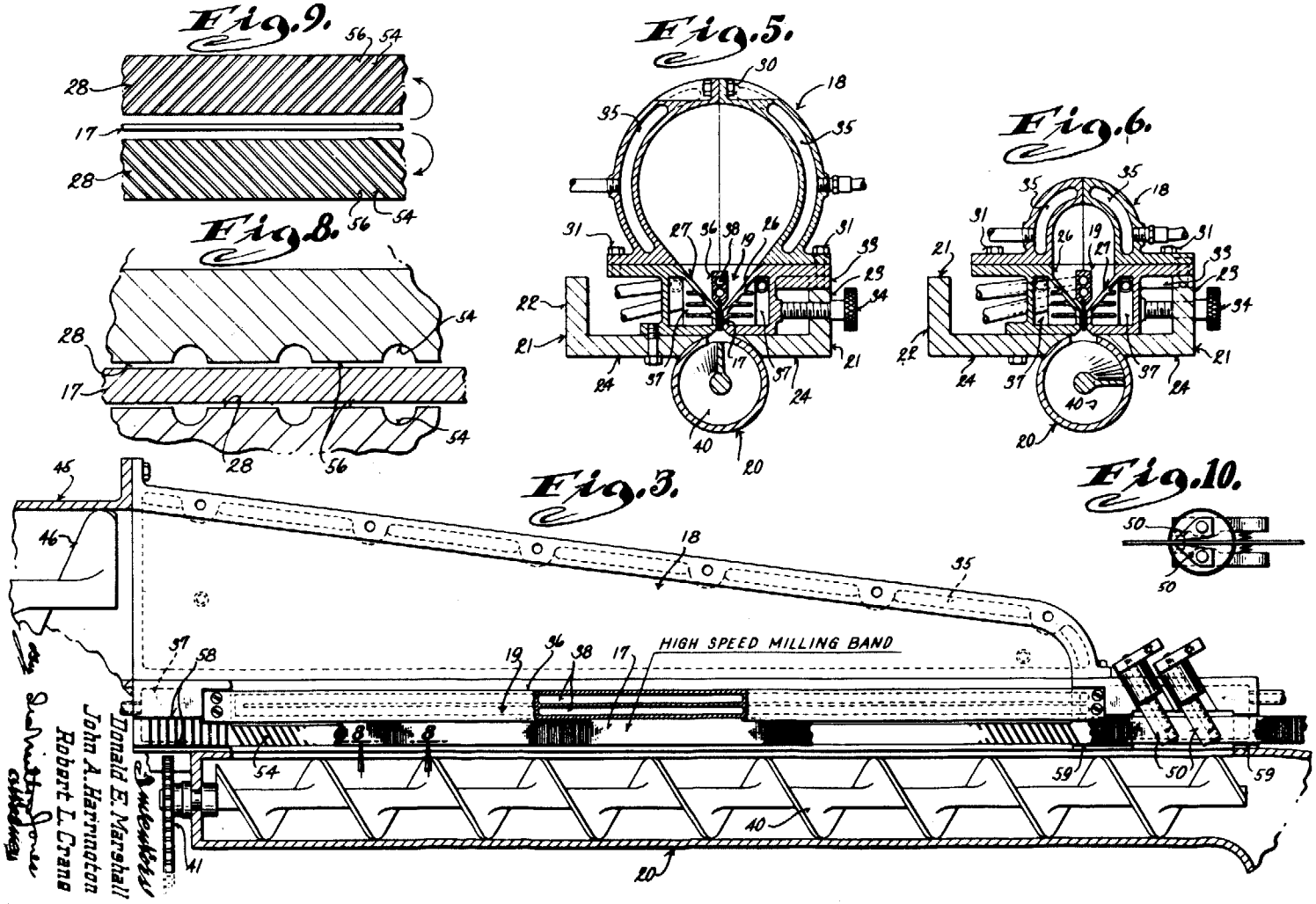
Figure 3 is an enlarged longitudinal sectional view taken through Figure 2 along the plane of the line 3—3 and illustrating the manner in which the material to be milled is fed through and removed from the milling zone.
Figure 5 is a cross sectional view taken through Figure 1 along line 5—5.
Figure 6 is a cross sectional view taken through Figure 1 along line 6—6.
Figure 8 is a greatly enlarged sectional view taken through Figure 3 along the plane of the line 8—8 and showing the congestion and aerating grooves in the sides of the stationary milling members.
Figure 9 is a diagrammatic view showing the grooved configuration on the surfaces of both stationary milling members thrown open and with the milling band edgewise therebetween.
Figure 10 is a view showing a pair of knives acting on the milling band to scrape soap from the sides thereof after leaving the milling zone.

In general the method of this invention comprises forming the soap material to be milled into an extremely thin sheet or film of between .001 and .015 of an inch in thickness. This sheet is force fed edgewise through a slit-like extrusion orifice and while it passes therethrough motion is imparted to the surface layer at one side of the sheet relative to the surface layer of material at the opposite side of the sheet at a speed high enough to effect subdividing and compacting of particles throughout the mass of the material comprising the sheet.

In this method it is essential that the feed and the relative motion between the surface layers of the sheets be at a rate sufficiently high to usefully employ the churning of the mass of the material comprising the sheet for the subdivision and compacting of particles in the mass of the material, and to also avoid temperature rise in the mass to or beyond the crystalline reversion temperature.

In exploring the nature of soap investigators have determined that soap is a two phase system, that is, that it has a hard crystalline phase and a soft more soluble liquid crystalline phase which together determine the soap structure. It has also been determined that important qualities are imparted to soaps by the conversion of the crystalline nature of this material. Physical alterations of its structure are known to achieve large transformations in such qualities of the soap as hardness, lathering, elimination of soap-dish jelly, swelling and welding without any other changes in the chemical formula, in the fats used, or in the moisture content.

The apparatus of this invention employs a high speed endless milling band to achieve these large transformations in the hardness, lathering, swelling and welding characteristics of soap solely by alteration of the physical structure of the soap effected by subjecting it to the high speed shearing and compacting action of the milling band.

Heretofore, the conversion of the physical characteristics of soaps has been limited to a few basic processes, one of which is taught in the Bodman Patent No. 2,205,539. In this process, the structure of soap is altered physically while the soap is in a semi-fluid state, but the process requires that the moisture content of the soap being worked be between fifteen percent (15%) and twenty percent (20%) and the temperature approximately 160° F. to maintain the semi-fluid condition of the soap.

Another basic process is widespread use at the present time is known as the cold milling method. In this process soap chips in a solidified state are fed between rollers which produce a limited degree of subdivision and compacting of the particles in the mass of the soap. The roller milling process, however, can only be carried out when the soap to be milled is in a certain highly critical state of plasticity which enables it to adhere to the rollers and thus feed properly through the bite of the rollers. This requires that the soap contain at least twelve percent (12%) to fourteen percent (14%) moisture.

The roller milling process is also characterized by a slow crushing and shearing action on the soap, in which the pressure on the soap is great but the rate of its application relatively slow. In contrast, the apparatus of this invention, which may be termed a high speed band converter, makes use of much more intense and extremely fast acting forces for the shearing and compacting of particles in the mass of the soap, thereby minimizing the exposure time of the soap in the milling process necessary to produce the desired particle subdivision and compacting. The refinement of soap is carried to a new high level by the method and apparatus of this invention, since through it extremely fine milling of soap may be accomplished on soaps of far lower moisture content than is possible on roller milling equipment, with the result that it is now possible to produce either aerated or deaerated low moisture converted bar soaps in the ultra-microcrystalline phase with the particles of the soap compacted to a very high degree.

In the past the employment of high shearing speeds has been discouraged because of such obstacles as the amount and rate of heat which they would cause to be generated in the soap to be milled; the limited ability to remove this heat and avoid crystalline reversion; the mechanical difficulties in maintaining close milling clearances; and the extremely low capacity of close clearance milling.

With the high speed band milling apparatus of this invention, however, it is now possible to produce ultra milled soap which will give longer lasting service because of its greatly increased viscosity, which will be less wasteful in use, and which will be free of cracks due to swelling during use.

Heretofore soap was prevented from developing cracks during use only if the soap material was homogenized in a semi-fluid state during the process of making the same, and this in turn required the presence of adulterating moisture as a plasticizer.

Heretofore, neither the "beta soap" made in accordance with the teachings of the Mills Patent No. 2,295,594, nor soap of the type made in accordance with Bodman No. 2,310,931, nor hard cold milled soaps had the advantages which result from the ultra refinement of soap by the method and apparatus of this invention.

Referring now more particularly to the accompanying drawings, which illustrate several types of apparatus embodying the principles of this invention, Figures 1 to 10, inclusive, show the preferred form of the apparatus. As here shown the apparatus comprises a frame 10 having an elongated horizontal bed and upright portions 11 at the opposite ends thereof, each defining a housing containing a large diameter pulley 13. These pulleys are supported by the frame for rotation on vertical axes adjacent to the ends of the frame with their peripheries in horizontal alignment with one another. One, or both, of the pulleys is adapted to be rotated at high speed by means of V belts 14 trained over sheaves 15 on the pulley shafts 16 and connecting with a driving pulley, not shown.

A flat endless band 17 is trained over the peripheries of the pulleys 13 to be driven at high speed thereby, and as will appear hereinafter, this band comprises the high speed milling member of the apparatus.

Encircling one straight horizontal stretch of the band 17, and extending for substantially the entire distance between the upright portions 11 of the frame, is an assembly of parts which jointly defines a nozzle-like feed chamber 18 above the band and open along its bottom, a milling zone 19, at opposite sides of the band, in open communication with the feed chamber and in which shearing and compacting of the soap or other material fed therethrough from the feed chamber is effected, and a receiving chamber 20 beneath the band.

This assembly is carried by a pair of opposite angle shaped members 21 extending between and fixed to the upright portions 11 of the frame and which together define a substantially channel shaped bridge with the flanges 22 and 23 of the channel extending upwardly. The horizontal legs 24 of the angle shaped members, which define the back or web of the channel, are at a level slightly beneath the lower edge of the band 17 and their adjacent ends are spaced slightly from opposite sides of the plane of the band to define the entrance into the tubular receiving chamber 20. The latter, of course, is supported from the undersides of the legs 24 of the angle shaped members.

Seated on the upper faces of the legs 24 of the angle shaped members 21 and at opposite sides of the band 17 is a pair of stationary milling elements or blocks 26 and 27 having flat milling surfaces 28 directly opposite the flat sides of the band 17 and spaced a very slight distance therefrom. Hence, it will be seen that the surfaces 28 of the stationary milling members and the opposite sides of the band 17 define a milling, or shearing and compacting zone, through which soap or other material in the feed chamber 18 may be forced to effect exceedingly fine milling of the material as it passes through the clearance spaces at opposite sides of the milling band.

Viewed in another manner the entire space between the surfaces 28 on the stationary milling members may be considered a slit-like orifice having a relatively short dimension crosswise of the band. Since the band 17 travels through the central portion of the space between the stationary milling surfaces 28, there are actually a pair of these slit-like orifices, one at each side of the band.

The feed chamber 18 is mounted on the top of the milling blocks 26 and 27 and is substantially tubular in cross section. It is made in complementary longitudinal sections, however, detachably secured together as by bolts 30 at the joint along the upper marginal edges of the members and other bolts 31 which pass downwardly through flanges on the lower edges of the sections to secure them to the milling blocks. In this manner the milling blocks are confined between the underside of the feed chamber and the horizontal flanges of the angle-like supporting members 21.

Referring to Figure 5 it will be noted that the milling block 27 is fixed with respect to its supporting member 21 and the section of the feed chamber seated thereon, while the other block 26 is slidable horizontally at right angles to the adjacent flat side of the milling band and guided for such motion by dovetail connections 33 with the upstanding flange 23 of its angle-like support 21.

Consequently the block 26 can be moved toward and from the adjacent side of the milling band to decrease or increase the transverse dimension of the space between the milling surfaces on the blocks. Such adjustment may be readily effected by loosening the screws 31 which thread into the block 26 and bodily shifting the same as by means of an adjusting screw 34 threaded through the flange 23 and connected with the block.

Attention is directed to the fact that the complementary sections comprising the feed chamber 18 have hollow side walls to define passages 35 through which water or any other suitable coolant may be circulated to remove heat from the walls defining the sides of the milling orifice and the material moving through the milling zone as well.

Again referring to Figure 5 it will be noted that the inner opposing sides of the milling blocks 26 and 27 diverge outwardly and upwardly from points just beneath the top edge of the milling band to define a substantially funnel shaped entrance to the milling zone above the surfaces 28 on the blocks.

It will also be seen that material passing downwardly from the feed chamber into the funnel shaped entrance of the milling zone is constrained to flow to opposite sides of a separator 36 extending the full horizontal length of the slit-like milling orifice and disposed edgewise in line therewith. The lower portion of this separator is disposed closely adjacent to the entrance to the milling orifice but is slightly spaced from the sloping side walls of the milling blocks so that the material passing downwardly between the blocks is metered and divided by the separator and formed into sheets before entering the milling orifice itself. Screws at the opposite ends of the separator mount the same in position at the inlet of the milling orifice, and these screws preferably provide for a degree of adjustment of the separator toward and from the mouth of the milling orifice so as to achieve the desired metering effect.

Both milling blocks 26 and 27 preferably have hollow interiors defining passages 37 through which water or any other suitable coolant may be circulated; and the separator 36 likewise has passages 38 through which a cooling medium may be circulated.

Figure 4:
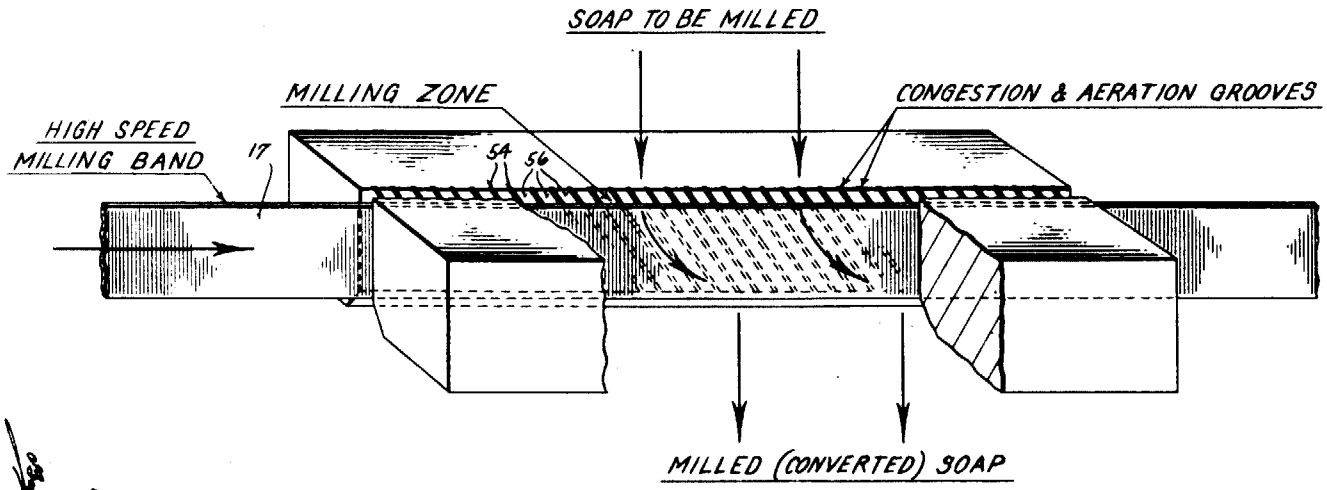
Figure 4 is a perspective view diagrammatically illustrating the manner in which milling is accomplished.

Referring for convenience to the Figure 4 diagram, soap or other material to be milled is fed under pressure into the spaces in the milling orifice at opposite sides of the band 17, and while in a thin sheet it is forced downwardly through the milling zone crosswise of the milling band. While passing through the milling zone, these sheets are subjected to intense shearing and compacting forces exerted thereon by the opposite sides of the high speed milling band 17, so that exceedingly fine subdivision and compacting of the particles in the mass of the material is accomplished.

The time the material is in the milling zone and the length of travel through the zone are regulatable and dependent upon the pressure of feed together with the speed of the band.

The material thus milled drops into the bottom of the receiving chamber 20 and is delivered therefrom by means of a screw conveyor 40 in its interior driven by a chain 41 connecting with a drive sprocket, not shown. It is sufficient to note that the conveyor carries the milled material horizontally in the direction of travel of the high speed milling band toward a large discharge opening 42 from which the milled soap may drop into any suitable container placed therebeneath.

At its top, or feed side, the milling zone will be full of material to be milled during operation of the apparatus, and hence closed to the atmosphere. However, the bottom or discharge side of the milling zone communicates with the interior of the receiving chamber 20 which can be kept open to the atmosphere by driving the screw 40 at a fast enough rate to prevent accumulation of milled material in the receiving chamber.

If desired, however, the discharge side of the milling zone may also be kept under pressure, and for this purpose a slide 43 mounted on the discharge end of the receiving chamber and having a restricted orifice 44 therein may be slid into place across the opening 42 of the chamber 20 to restrict the discharge of material from the chamber and thus allow the milled material to accumulate therein and to be acted upon by the screw 40 which will keep pressure upon the material at a magnitude determined by the size of the restricted orifice 44 and the rate of rotation of the screw.

The feed chamber 18 is supplied with soap or other material to be milled by means of a more or less conventional plodder 45 mounted on the left hand upright portion 11 of the frame in line with the feed chamber. The plodder, of course, is provided with the customary screw 46 which is adapted to be driven by a pulley 47 connected by a belt (not shown) with a drive pulley (not shown). The plodder feeds horizontally into the feed chamber, and because of the relatively great length of the latter, its cross section preferably decreases uniformly toward the end thereof remote from the plodder. Hence, uniform pressure will be maintained upon the material at the inlet of the milling zone along the entire horizontal length of said zone.

Figure 11:
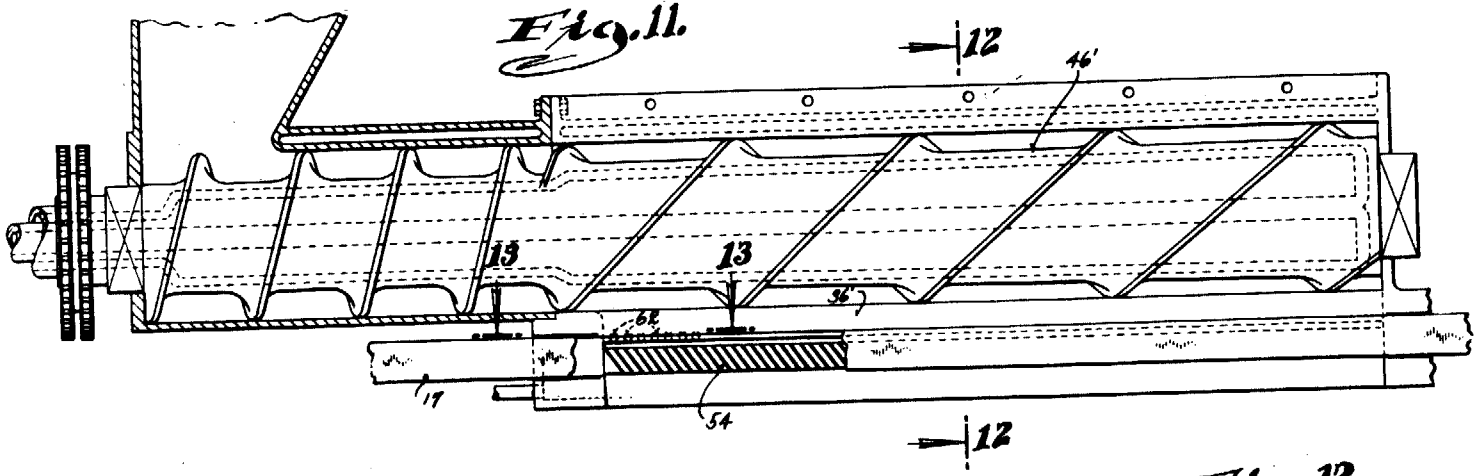
Figure 11 is a view similar to Figure 3 illustrating a modified form of feeder for forcing material to be milled through the milling zone.
Figure 12:
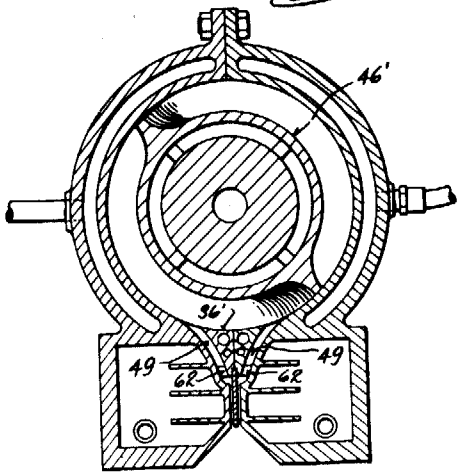
Figure 12 is a cross sectional view through Figure 11 taken along the plane of the line 12—12.
Figure 13:
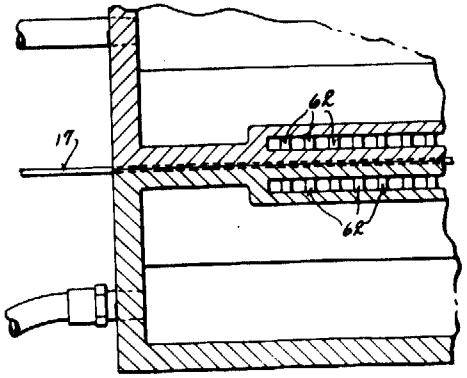
Figure 13 is a detail sectional view taken through Figure 11 along the plane of the line 13—13.

Another way of accomplishing the same result, but by which greater feed pressures can be obtained, is shown in Figures 11, 12 and 13. These figures illustrate a slightly modified form of feed chamber having an extension 46′ of the plodder screw therein. The cross section of the extension 46′ and the pitch of the threads thereon may increase progressively toward the end of the feed chamber remote from the plodder so as to maintain uniform feed rate and pressure along the entire outlet side of the feed chamber.

In this case also soap or other material to be milled is formed into film-like sheets before entering the milling spaces at opposite sides of the milling band. For this purpose, the feed chamber itself is provided with elongated slit-like passages 49 at either side of a separator 36′ formed as part of the feed chamber structure.

As best shown in Figures 3 and 10, soap or other material adhering to the sides of the high speed milling band may be removed before the band emerges from between the milling blocks by knives 50. The edges of these knives in contact with the sides of the milling band, however, preferably extend diagonally across the band as shown best in Figure 3.

As will hereinafter appear in greater detail, the size of the space between the milling band and the surfaces 28 on the milling blocks is one of the important factors governing the effectiveness of the milling operation. Because of the need for some adjustment of the size of this space, it may be desirable to have the surfaces 28 formed on readily detachable strips 52 extending along the entire inner sides of the blocks. Thus, the strips 52 may be detached and replaced by other similar strips of slightly less or greater thickness, depending upon the size of the space wanted.

Also, as will appear in greater detail hereinafter, the surfaces 28 on the opposing side walls of the milling blocks may either be grooved as at 54, or they may be smooth as seen at 55 in Figures 16 and 17. When grooves are used, they are relatively closely spaced but have less width than the flat lands 56 between them. Also these grooves extend diagonally with respect to the milling band so that the material entering the milling zone will not only flow downwardly but will be directed in the direction of travel of the band to some extent while it is being subjected to intense shearing and compacting forces by the band.

The grooves 54 may be termed congestion and aerating grooves since they augment the shearing and compacting action of the high speed milling band and also make possible occlusion and fine dispersion of air in the soap being milled. This air is introduced into the milling zone as a thin film adhering by molecular forces to the sides of the milling band.

On the other hand when the sides of the milling orifice are smooth as shown at 55 in Figures 16 and 17, a minimum of aeration of the soap or other material being milled takes place, and the resulting product is usually deaerated.

From the description thus far, it will be seen that the apparatus has several outstanding features which enable it to exert far more intense shearing and compacting forces on the soap or other material being milled than was hitherto possible. These features are that each side of the movable milling member or high speed band acts on and imparts high speed motion to the surface layer of the film-like sheet of soap, of between .001 and .015 of an inch in thickness, with which it contacts; the fact that the milling band is adapted to travel through the milling zone at speeds ranging between 2,000 and 10,000 feet per minute; and the fact that at such speeds of travel the band is able to subject the soap or other material being milled to forces which result almost completely in shearing, sub-dividing and compacting of the particles in the mass of soap without uselessly churning the soap and thus incurring the possibility of destructive temperature rise therein.

Of very great importance also is the fact that soap or other material to be milled is force fed under pressure on the order of fifty (50) pounds per square inch or higher, crosswise of the band travel and through the milling zone, so as to almost completely unburden the high speed milling band of all that work which is related to the feeding function or the transporting of the soap into and through the apparatus with the result that greater shear intensity and consequently highly efficient conversion is achieved.

The force feeding of solid soap or other material to be milled through the milling zone under substantial pressure is in itself a novel innovation in milling apparatus of the type here in question. Hitherto, for example in one form of rotating device, namely conventional cold roller milling apparatus, the feeding of soap of high viscosity was accomplished entirely by the adhesion of soap to the surface of the rollers and hence the soap was more or less impositively conducted through the bite of the rollers. Moreover, this type of apparatus does not lend itself to pressure feeding of the soap through the milling zone for the reason that the pressure of the soap against the surfaces of the rollers would exert a terrific braking effect thereon resulting in high loss of power; and the difficulty which would be encountered in the provision of a running seal around the peripheries of the feeder to constrain the soap to passage through their bite. Such seals also would exert a braking effect or drag on the rollers which together with the drag of the soap material on the face of the rollers would make it impossible to control the temperature caused by drag or obtain either efficient operation of the apparatus or speeds great enough to produce efficient shearing and compacting of particles in the mass of the material being milled.

Also, all roller mills are limited to shearing zones with no appreciable width because of the line contact between two articulating cylinders. This limitation can only be met by using a prohibitive number of rollers to accomplish fine particle refinement.

An analysis of all other forms of rotating milling apparatus, such as the rim of a spoke driven wheel or impeller operating within a surrounding casing that carries the stationary milling members, or disc types such as the common attrition mill operating with a single disc against a stationary casing or with two discs running in opposition to each other, or two elongated articulated worm impellers of small diameter operating within a pressure retaining casing, will reveal that the power loss due to feed pressures on the milling elements by the fed material itself or by the running seals used to confine the material to its path in the milling zones, will become major limitations not only on the efficiency of the process but more importantly on the intensity to which the process can be carried without reaching a point where the heat generated by these losses can no longer be removed and becomes destructive to the material being refined.

In the apparatus of this invention, however, the straight line travel of the high speed milling band lengthwise through a slit-like milling channel or orifice involves the use of a seal embracing only the cross sectional area of the relatively thin milling band, at the opposite ends of the milling channel. In the present case the seals may be in the nature of a labyrinth of grooves in the opposing walls of the milling blocks at a relatively short area 58 thereof where the band enters the milling zone; and similar spaced sealing areas 59 of somewhat shorter dimensions at the opposite end of the milling zone and between which the knives 50 are situated.

By reason of the fact that soap in a solid highly viscous state approaches one edge of the band and passes through the milling zone crosswise of the band, equal pressure is exerted upon opposite sides of the band to hold it centered in the milling orifice. This edgewise approach of feed to the band also minimizes the drag or braking effect of the soap on the band. Since the milling band is driven at a very high speed, and the soap is travelling at a substantial rate crosswise of the band through the milling zone, the inertia of the mass of material comprising the sheets in the milling zone is usefully employed to eliminate the possibility of useless churning of the soap mass and to greatly enhance the shearing and compacting action of the band.

With the apparatus of this invention, exceedingly fine subdivision and compacting of particles in the mass of the soap or other material milled is accomplished without rasing the temperature of the soap to either the melting point or to the crystalline reversion temperature, primarily because of the exceedingly high speed at which the milling band 17 is driven and the short time the material is in contact with the band.

Theoretically, soap in a solid state formed into a film-like sheet .005 inch in thickness can have one side thereof acted upon by the side of a high speed shearing and milling band to produce subdivision of particles in the mass of soap in a surface layer that would be as little as one micron in thickness. This can be done without heating the remainder of the sheet provided the same is moved out of shearing contact with the high speed milling band before the band is allowed to dig any deeper into the sheet and also providing the action of the band does not produce any appreciable degree of distortion in the mass comprising the remainder of the sheet. Whatever exceedingly small amount of heat that may result from particle subdivision and compacting in this theoretical one micron layer will pass largely into the metallic high speed milling band rather than into the soap which is a much poorer conductor of heat than the band.

In actual practice, however, the shearing and compacting action of the high speed milling band goes much deeper into the sheet of soap passing through the milling zone (probably 10 to 30 microns) than the theoretical one micron surface layer and also some churning of the soap comprising the sheet does occur. However, there are two kinds of churning, the slow and easy churning characteristic of conventional roller milling apparatus, and the fast and highly intensified churning produced in the soap by the apparatus of this invention. Such violent churning also produces particle subdivision and compacting in the mass of a sheet of soap which is only approximately .005 of an inch in thickness; and thus there is no serious waste of power or destructive amount of heat generated in the soap being milled in the apparatus of this invention as long as the proper clearance is maintained at opposite sides of the high speed milling band, feed pressure on the soap and the rate of travel of the soap across the milling zone is properly adjusted, and the proper design of congestion groove is selected for each type of material to be milled.

Essentially five variable factors must be manipulated in the high speed band converter of this invention: (1) the pressure required to feed the soap through the milling zone; (2) the "clearance" in the shearing and compacting zone, or more particularly the space between the milling surfaces on the stationary milling elements and the adjacent sides of the high speed milling band; (3) the rate of travel of the high speed milling band; (4) the width of the shearing and compacting zone, measured in the direction in which the soap travels therethrough; and (5) the length of the shearing and compacting zone measured in the direction of band travel therethrough. The following is a discussion of each of these five factors:

Feed pressure

The rate, or quantity, of soap flowing through any given "clearance" is directly proportional to the feed pressure. In other words the soap is caused to flow faster through the milling zone as the feed pressure is increased. At present, feed pressures of approximately seventy (70) pounds have been used satisfactorily on tests conducted with the apparatus, but much higher pressures can be used.

An important feature of this mechanical arrangement is the accommodation of extremely high pressures by the labyrinth seals and the ability to entrain a molecular layer of gas into such high pressure zones without it being wiped off the entraining member.

While higher feed pressures result in higher capacities of the apparatus without necessarily overloading the shearing capacity of the milling or conversion zone, these higher pressures also result in better cooling since the soap has less opportunity to absorb heat generated in the milling zone and exposure to the cooled walls of the stationary milling members is better.

Clearance

The size of the space or "clearance" between the milling surface on each of the stationary milling members and the adjacent side of the high speed milling band determines the thickness of each sheet of soap to be acted upon by the milling band, and can be from .001 to about .015 inch. In general the less the "clearance" the more useful work goes into particle shearing and compacting and less useless work into churning at a rate insufficient to produce shearing of the particles in the mass of the soap.

With smaller "clearances," both the band and the fluid cooled stationary milling members are better able to remove heat from the milling zone.

Also with smaller "clearances," the band may be of less width (edge to edge) so long as the band still has sufficient width that all particles in the material passing across it will be acted upon and sheared by the band; but this, of course, has the effect of lowering the capacity of the apparatus for any given feed pressure and length of milling zone.

Band speed

The milling band must always be driven at a speed which takes advantage of the inertia of the mass of the sheet acted upon so that the combined forces of the band and inertia on the mass of soap comprising the sheet cause high speed motion to be imparted to the surface layer of the sheet contacted by the band relative to the surface layer at the opposite side of the sheet. In addition the speed of the band must be high enough so that any churning of the mass of soap between said surface layers will also be at a rate great enough to accomplish subdivision and compacting of particles in the mass of soap comprising the sheet.

The faster the band is driven the more intense becomes the shearing and compacting (but not in direct proportion to speed) of particles in the mass of material acted upon by the band, and the less useless churning in the mass. Conversion of the physical characteristics of soap by fine subdivision and compacting of the particles in the mass of the soap requires a band speed of at least about 1,000 feet per minute, and a film-like sheet of soap acted upon by the band measuring approximately .005 inch in thickness. At band speeds over 1,000 feet per minute shearing of the soap sheet and particles in the mass thereof occurs in a zone nearest the band regardless of how far the band may be spaced from the surface of the adjacent stationary milling member; and the high speed churning of the mass forcefully fed through the milling zone also accomplishes shearing and compacting of particles by churning action alone and by the fact that such churning presents new particles to the band from the depth of the sheet.

In general the band should be driven at a rate approximately 6 to 18 times faster than the rate at which soap is force fed through the milling zone.

If the band is to be driven at extremely high speeds it is possible that the width of the band (measured from edge to edge thereof) may be made less without sacrificing the efficiency of the shearing and compacting action. With higher band speeds, there is also more tendency for heating to take place in the milling zone, but this heat is taken away both by the band and by the walls of the fluid cooled stationary milling members.

Although the band may heat up during the milling process, the soap travels across it and through the milling done at such a rate of speed that it is in contact with the band only for an extremely brief time, and hence it is incapable of absorbing any appreciable heat from the band.

The width of the milling zone

Since the degree of conversion of the soap sought seems to require reduction of the size of the particles in the mass of soap to approximately ½ micron, theoretically therefore, there is room for 250 of these ½ micron particles in the optimum space or "clearance," between one side of the milling band and the surface of the adjacent stationary milling element, of .005 of an inch. Hence, it becomes clear that a minimum width is that at which all particles in the mass of material being milled are reached.

It also appears that the most intense shearing in a sheet of soap of this thickness is throughout a zone of only 10 to 25 microns in extent next to the band. However, tests have shown that the churning produced in the sheet of soap is at a high enough rate to effect shearing and compacting of particles in the mass of material comprising the sheet extending nearly all through the .005 of an inch of its thickness due to the feed pressure, and better shearing results with the use of the congestion grooves in the surfaces on the stationary milling members.

Tests indicate that a 1 inch wide band travelling at 3,000 feet per minute will convert soap well beyond the degree possible with conventional cold roller milling apparatus; while a 2 inch band travelling at the same speed will effect much greater conversion and produce cold milled soap of an unprecedented high viscosity. To use a band wider than 2 inches under the stated conditions seems to achieve little or no further conversion.

When high speed milling bands wider than 2 inches are used, lower band speeds can be employed for a given degree of conversion. Certain effects of a high degree of conversion, such as transparency of the finished product, may involve alignment of particles in the mass of soap milled as well as particle subdividing and compacting. Where transparency in soap is sought, band speed and clearance are preferably adjusted to achieve "conversion" of the soap, and the viscosity of the "converted" soap is measured. The viscosity of the soap can then be considered a guide as to the minimum conversion of the soap required. Thereafter the speed of the band may be lowered and the width of the band increased with the result that better transparency of the soap may be achieved at any given degree of conversion.

In special applications of this process to homogenization without necessarily reaching particle subdivision, a wider band is used (such as 12 to 14 inches). These widths require careful attention to congestion groove design so as to evenly spread the thin layer of material being treated all over the wider band.

Length

The length of the milling slot or zone, measured in the direction of band travel therethrough, has no proportional effect upon the degree of conversion of the soap, but it is obvious that the capacity of the apparatus is directly proportional to the length of this zone.

The following table, based upon test runs on soap of the standardized formula of approximately 15% CNO and 85% tallow, and at a moisture corrected to 7%, defines the special effects of each variable discussed above except length of the milling slot or zone (in the direction of band travel), which has a directly proportional effect on capacity. Therefore, milling rate is expressed in pounds per hour per inch of length of the milling zone.

TABLE

| Test | Clearance, in. | Pressure, lbs./sq. in. | Shear, ft./min. | Width, in. | Rate, lbs. | Temp., Out. | Conversion Index |
|---|---|---|---|---|---|---|---|
| | | | | | | ° F. | |
| 1 | .002 | 50 | 1,000 | 1 | 20 | 100 | 70 |
| 2 | .002 | 70 | 1,000 | 1 | 25 | 105 | 72 |
| 3 | .002 | 70 | 3,000 | 1 | 25 | 120 | 100 |
| 4 | .002 | 70 | 1,000 | 2 | 25 | 110 | 80 |
| 5 | .005 | 50 | 1,000 | 1 | 40 | 90 | 60 |
| 6 | .005 | 70 | 1,000 | 1 | 50 | 100 | 65 |
| 7 | .005 | 70 | 3,000 | 1 | 50 | 130 | 80 |
| 8 | .005 | 70 | 3,000 | 2 | 50 | 135 | 90 |
| 9 | .010 | 70 | 3,000 | 2 | 70 | 140 | 75 |
| 10 | .010 | 70 | 5,000 | 3 | 70 | 145 | 100 |
| 11 | .015 | 70 | 7,000 | 3 | 100 | 150 | 90 |
| 12 | .015 | 70 | 9,000 | 3 | 100 | 160 | 100 |

Aeration

Notwithstanding the fact that soap fed through the milling zone in the form of a film-like sheet is subjected to extremely intense shearing and compacting forces by the high speed milling band to effect exceedingly fine milling and actual conversion of the physical properties of the soap, it is also possible to effect aeration of the soap during its passage through the milling zone. This aeration is explained by the ability of the high speed milling band to carry air into a highly compacted milling zone as a thin molecular film which tenaciously adheres to the sides of the band. Such air is brought into contact with the adjacent surface of the sheet of soap passing through the milling zone and is occluded and finely dispersed in the soap by the joint action of the high speed milling band and the enveloping action on the material in the congestion and aerating grooves 54 in the sides of the milling slot or orifice.

These grooves not only assist the band in producing intensified churning in the mass of soap passing through the milling zone and thus augment the shearing and compacting action of the band, but also envelop the air introduced into the soap mass. Since the air brought into the milling zone by the band is entirely occluded and dispersed in the mass of soap by speed and inertia while the soap passes through the milling zone, it is unnecessary to make the milling zone air-tight to obtain a thoroughly aerated material.

Aeration can also be facilitated to some extent by effecting shreading of the soap immediately prior to entry thereof into the clearance spaces between the sides of the milling band and the surfaces of the stationary milling elements adjacent thereto. This can be accomplished as shown in Figures 11, 12 and 13 by a series of tooth-like obstructions 62 extending transversely across the passages 49 at opposite sides of the separator 36' and spaced from one another along the length of the separator adjacent to the bottom thereof. These obstructions, and the milling blocks themselves, may be formed integrally with the sections of the feed chamber, as seen best in Figure 12.

As stated the obstructions 62 cause shreading of the soap just prior to its entry into the milling zone so that the soap brought into contact with the opposite sides of the milling band just outside the entrance to the milling zone is in a better condition to envelop the air brought into the milling zone by the band.

When the apparatus is operated with smooth surfaces on the stationary milling members the air brought into the milling zone by the high speed milling band seems to be driven out over the lower edge of the band and lost if the receiving chamber is open.

Figure 15:
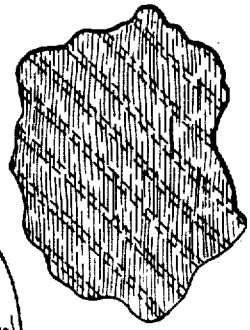
Figure 15 is a view of the opposite side of the flake shown in Figure 14.
Figure 14:
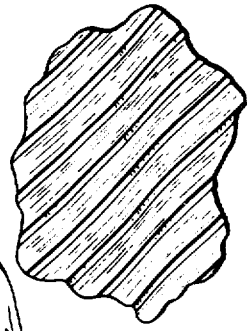
Figure 14 is a side view of the flake produced by the conversion of soap by the apparatus of this invention.

Aside from their aerating function the congestion grooves 54 cause churning of the soap passing through the milling zone to such an extent as to prevent by-pass of the soap through the milling zone via the grooves, or without all portions in the mass of the soap being subjected to the shearing and compacting effect of the high speed milling band. Examination of the aerated flakes (either converted soap or synthetic detergent) discharging from the milling zone, see Figures 14 and 15, show that the flakes have spaced ribs on one side thereof produced by the congestion grooves with the material in these ribs aerated to the same degree as the thinner areas of the flakes between the ribs. Also these thinner areas between the ribs show fine surface marks or lines which extend in the direction of band travel at one side of the flake and similar but less distinct lines at the opposite ribbed side of the flake which are substantially crosswise thereto. These marks or lines evidence the effects of violent tearing action on the soap passing through the milling zone when the apparatus is operating properly. This unique texture, in flakes packaged for laundry use, provides a degree of solubility and a guard against matting on the clothes which is important.

While the converted soap product of the method and apparatus of this invention preferably is a thin flake having between five percent (5%) and seventeen percent (17%) moisture content, it will be appreciated that materials of lower than five percent (5%) moisture content can be milled as well. With soap of such lower moisture contents, the milled soap will be in a powdered state, rather than flake form.

It will also be understood that bar soaps can easily be made from these flakes by feeding them into a plodder and extruding in a more or less conventional manner. A plodder especially suited for handling aerated flakes without deaeration of the resulting product forms the subject matter of the copending application of Donald E. Marshall, Serial No. 177,268, filed August 2, 1950.

Synthetic flakes made in accordance with this invention may be made into bars by first pulverizing the flakes and thereafter subjecting the pulverized material to aerated compacting such as in the [copending application of] Donald E. Marshall [Serial No. 129,093, filed November 23, 1949] *Patent No. 2,594,956 issued April 29, 1952.*

The band converter process of this invention produces soap having the following desirable and highly useful properties:

A. The highest viscosity for a given soap formula that has ever been produced while preserving the lathering qualities of "beta" phase soap.

B. Non-swelling type of gel. It seems that the intensity of shearing and compacting achieved in the process is sufficient to produce the most closely knit particle structure known without the use of adulterants so as to give a finished bar with good lathering qualities and yet long lasting texture.

C. Cold welding properties which are unique for milled low moisture, unadulterated soaps.

D. The highest lathering coefficient for soap in bar form because of the combined advantages of "beta" phase crystals and low moisture together with a shearing and compacting hardness which permits the use of the more soluble fats in the formula.

E. High resistance to deaeration, enabling integration of aerated flakes or chips in a conventional plodder and extrusion without squeezing the air from the flakes, thus yielding a well-knit soap even at moistures from twelve percent (12%) down to five percent (5%) and with a crystalline structure favoring the lathering qualities.

F. The best light transmission for unadulterated soaps having a particular value in giving a transparent jacket or finish to the bar.

If desired, the high speed milling band may have a slightly roughened surface indicated in Figure 18. As herein shown both sides of the band are given an extremely fine film-like surface 64 which may be defined by very slight scratches on the sides of the band at an angle of 45° to its long dimension, or substantially at right angles to the congestion and aerating grooves in the surfaces of the stationary milling elements. Such a band is capable of developing higher tearing forces on the soap, and these higher forces may be quite useful, when milling other materials such as wheat flour or the like. When using the band of Figure 18, the stripping knives should be set at such a diagonal angle with respect to the band that their edges are disposed at right angles to the lines or scratches on the sides of the band.

While one of the most important uses of the apparatus described is the conversion of the physical properties of soap, its use is by no means limited to the refinement of soap. It may be used also for the refining of chocolate, margarine, paint and many other materials of similar nature as well as for grinding and dehydrating during grinding of powdered or particulated material. For this latter use, the feed chamber and plodder may be removed and a feed means for conducting the material through the milling zone entrained in a carrier gas such as air employed in place thereof. Also, the recycling of once band-converted and aerated material yields an extraordinary uniformity and fineness of grind.

When applied to dehydrating grinding operations the band may be heated with a direct flame to carry heat in between the sheared films of material as well as using the jacketed milling elements as steam heated surfaces for driving off vapors. New degrees of grinding reduction are accomplished because the material as it becomes extremely fine will still encounter shearing conditions at these high speeds and close clearances.

Abrasive materials such as the "builders" used with soaps or synthetic detergents can be subdivided more successfully by this process because of good temperature control and the minimized abrasion of milling elements. The material is ground up on surfaces formed by the material itself.

Particle fineness and particle nearness within the mass of a pulverized piece of material is not to be confused with the sieve test of the pulverized material and it is important to be able to preserve this "conversion" during grinding by the use of the present invention.

Synthetic detergents and their builders which are usually very hard salt crystals, particularly present a milling problem due to the erosion of the machinery on the milling elements. Such erosion seriously darkens and otherwise contaminates the detergent. To avoid milling, these synthetic materials have been molded from powders at extremely high pressures, sufficient to mill the crystals and in that way refine the bar's texture to some degree. However, in re-solidifying when the pressure is removed these crystals do reform and the bar inevitably has a sandy texture which is objectionable in fine toilet soap merchandising.

The process for converting these materials into high quality bars calls for either superfine grinding and aerated powder compacting such as taught in the [copending application of] Donald E. Marshall [Serial No. 129,093, filed November 23, 1949] *Patent No. 2,594,956 issued April 29, 1952*; or conversion by shear and compacting of particles in mass, according to the present invention, at temperatures below the crystalline reversion point and with adequate aeration to lessen the extreme density of these materials in respect to soap.

The present process has features for reducing the abrasion of milling members to a minimum. The shear is accomplished essentially by speed in place of pressure and this shear is largely between two surfaces of the material itself. The shearing band and channel walls can be considered as expendable and cheaply replaced. The aeration is done in the solidified state.

As indicated hereinbefore, the purpose of the method and apparatus of this invention is to cold mill soap to effect conversion of the physical properties thereof by subdivision and compacting of particles or crystals in the mass of the soap to the state where they may be said to be in the ultra-microcrystalline phase. Since the viscosity or hardness of the soap increases as conversion becomes more complete, it will be apparent that the degree of conversion can be determined by measuring the viscosity of the soap.

Heretofore there has been no way of measuring accurately the viscosity of such a highly viscous solid material as soap. With the viscosity testing apparatus shown in Figure 20, however, it is possible to prove that the high speed band converter of this invention produces soap of much higher viscosity than was obtained by any prior cold milling method, and to thus evidence the fact that fine subdivision and compacting of particles in the mass of soap has been accomplished by the apparatus.

An accurate testing procedure for measuring the degree of conversion of soap involves measuring the time required to displace a predetermined volume of soap under constant pressure through a relatively small standardized and self-cleaning aperture.

Figure 20:
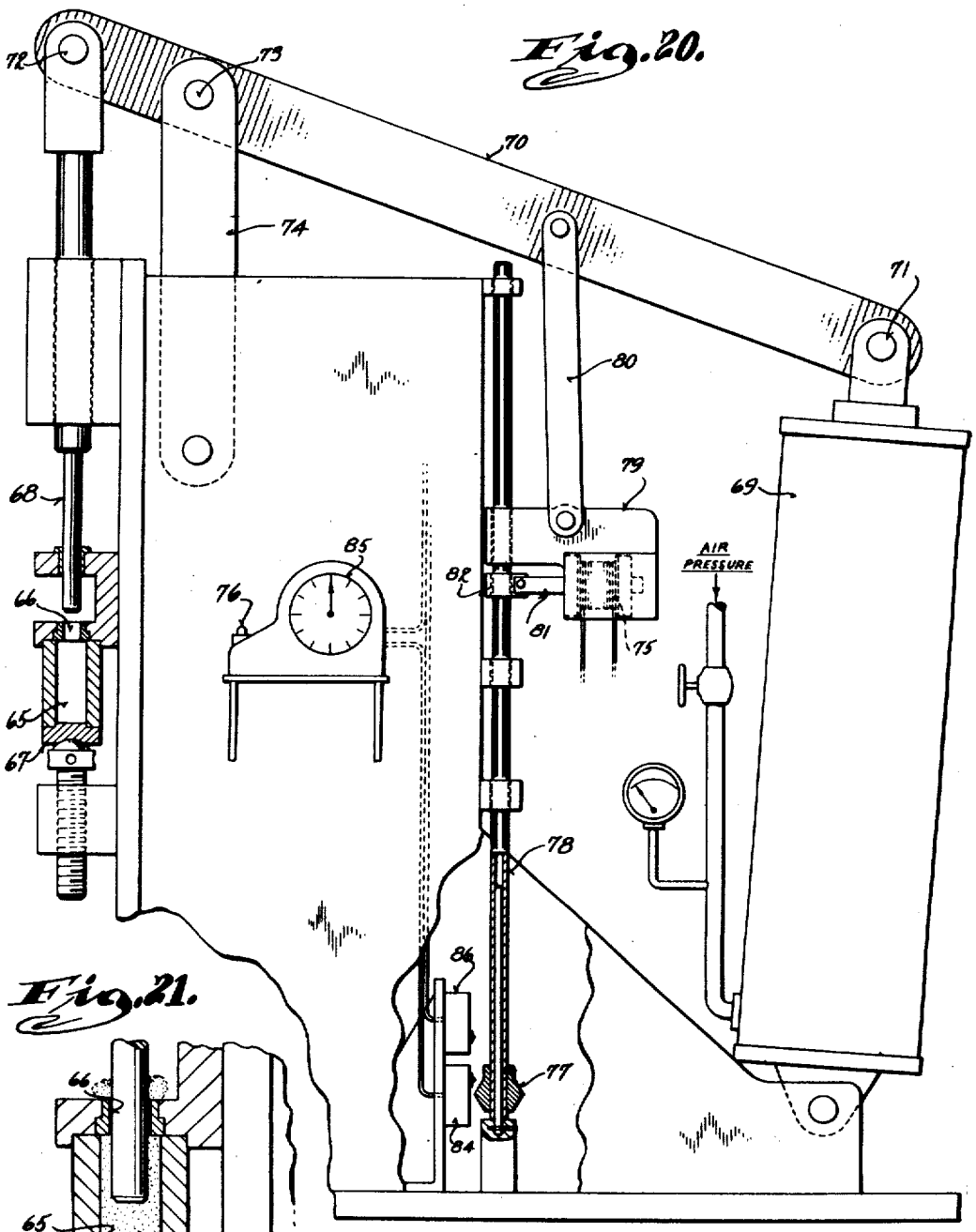
Figure 20 is a view partly in side elevation and partly in section showing a special viscosity testing apparatus.

For this purpose the apparatus shown in Figure 20 comprises a cylinder-like die chamber 65 having a restricted neck 66 at its top, and closed at its bottom by a removable plug 67. The soap to be tested is loaded into the die chamber 65 and a plunger 68 of a diameter to loosely fit the bore of the neck 66 is forced downwardly therethrough and into the mass of soap in the die chamber. This is accomplished by means of an air cylinder 69 connected with the plunger through a lever 70. One end of the lever is connected as at 71 to the piston of the air cylinder, and its opposite end is connected as at 72 to the plunger. Close to the plunger end of the lever the latter is supported for pivotal motion about a horizontal axis on a pin 73 carried by a link 74 connected with the frame of the apparatus.

The diameters of the plunger 68 and the restricted orifice or bore in the neck 66 are such that the small space between the exterior of the plunger and the wall of the orifice preferably has a cross sectional area of approximately .0015 inch times 1.57 inches, with a length of approximately ½ inch for the neck 66. The motion of the plunger during the test serves to prevent clogging of this extremely small space.

Figure 21:
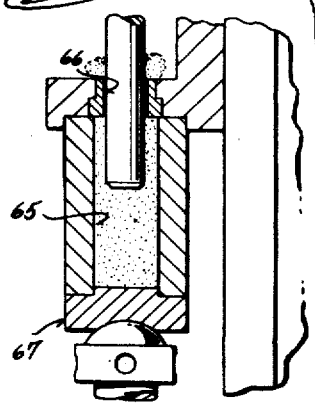
Figure 21 is an enlarged sectional view of a portion of the apparatus seen in Figure 20.

In conducting a viscosity test the cylinder 69 is connected with a source of air under pressure regulated to keep it uniform. This causes the lever 70 to rock in a counterclockwise direction about its pivot 73 and force the plunger 68 downwardly through the orifice in the neck 66 and into the mass of soap contained in the die chamber 65. The plunger is allowed to travel into the die chamber far enough to make certain that all of the voids in the soap have been eliminated, which fact will be evidenced by a uniform flow of soap upwardly through the space between the side of the plunger and the side wall of the bore in the neck 66, as seen in Figure 21.

As soon as the apparatus has been placed into balanced operation through achievement of an even flow of soap out of the die chamber a solenoid 75 is energized such as by manual depression of the actuator of a push button switch 76 to effect connection of a trigger 77 with the lever 70. The trigger is fixed on a tubular member 78 mounted on the frame of the machine and guided for up and down reciprocatory motion relative to the frame. Also slidable on the tubular member 78 is a supporting block 79 upon which the solenoid 75 is mounted and this supporting block is connected by means of a link 80 with the lever 70 so that as the arm of the lever travels upwardly the solenoid will be raised with it. It is the function of the solenoid 75 to releasably lock the tubular member 78 to the lever 70 through the link 80, and for this purpose the plunger 81 of the solenoid carries a collar 82 on its outer end, and in which the tubular member is slidably received. When the solenoid is energized, inward travel of the plunger 81 draws the side of the tubular member against the hole 83 in the block 79 to frictionally lock the tubular member thereto.

With the tubular member connected with the drive arm of the lever 70 in this manner the trigger 77 begins to rise upwardly with the tubular member and after a very short distance of upward travel it engages the actuator of a switch 84 to complete an energizing circuit to an electric clock 85, thereby starting the clock. As the plunger 68 is forced deeper into the die chamber the trigger 77 rises accordingly but at a rate which is determined by the flowability of the soap through the clearance space around the plunger. After a measured distance of upward travel, the trigger engages the actuator of a second switch 86 to stop the clock so that the time it took to displace a predetermined volume of soap from the die chamber will be indicated by the clock.

The time interval so registered will be the measure of the viscosity, and comparisons can be made on the testing apparatus between soap samples of equal moisture content but varying degrees of milling.

By this means it is possible to determine the viscosity, for instance, of a conventional cold roller milled soap, and to compare with it the viscosity of soap which has been cold milled and converted by the method and apparatus of this invention. The difference in the elapsed time for the displacement of equal volumes of the two soaps will thus indicate the greater percentage of viscosity or hardness in the converted soap.

A large number of tests on soap ranging from five (5) to fifteen (15) percent moisture content has given the following index figures on relative viscosity:

| Moisture Content | 5% | 12% | 15% |
|---|---|---|---|
| Framed Soap | 4.0 | 2.1 | 1.0 |
| Milled Soap | ------- | 2.3 | 1.2 |
| Converted Soap | 6.1 | 3.2 | 1.5 |

Another extremely valuable characteristic of the soap which has been converted by the method and apparatus of this invention is that it has very little tendency to swell when immersed in water for any length of time. The swelling properties or swelling coefficient of soap is accurately determined by pressing specimens of the soap to be tested to the dimensions of ½ inch diameter by 1 inch long. This is done in a cylinder die under 5,000 pounds per square inch pressure. The compressed specimens are then submerged for ½ their length in water of standardized hardness which is maintained at 80° F., and allowed to remain in this condition for seventeen (17) hours. Thereafter the specimens are withdrawn for examination and measurement.

The measurement is accurately accomplished by placing the swollen samples immediately upon removal from the water upon the "stage" of an optical comparator so that the shadow cast by the sample can be accurately scaled.

A large number of tests gave the following degrees of swelling expressed in inches:

| Moisture | 5% | 10% | 15% |
|---|---|---|---|
| Converted Sample | .010 | .012 | .013 |
| Milled Soap A (Lux) | ------- | .022 | ------- |
| Milled Soap B (Pamolive) | ------- | .027 | ------- |
| Milled Soap C (Camay) | ------- | .030 | ------- |
| Floating Soap A (Ivory) | ------- | ------- | .030 |
| Floating Soap B (Swan) | ------- | ------- | .020 |
| Framed Soap | .016 | .017 | .018 |

The method of converting soap and other viscous materials in a solid state by subjecting extremely thin layers or sheets of the material to intense shearing and compacting forces applied thereto at extremely high speed may also be carried out in another type of apparatus, as seen in Figure 19. This apparatus embodies a wheel 120 rotatable at high speed and having its periphery or rim 121 facing and very close to a concentric stationary milling surface 122 on the inner wall of a hollow annular stationary milling member 123.

The narrow slit-like space between the rim of the wheel and the surface 122 again defines an elongated high speed milling and compacting zone or orifice, and material such as soap to be milled and converted to what may be termed the ultra-microcrystalline phase is force fed downwardly through this space.

Seated on and fixed to the top of the stationary milling member 123 is a frusto-conical housing 124 having a hollow water cooled wall. The small diameter end of the housing is uppermost and connected with the outlet *124'* of a vertically arranged plodder [to have] *by which* the soap or other material to be milled *is* force fed downwardly into the interior of the housing. The soap is fed into the housing, coaxially of the wheel 120, and is deflected outwardly toward the rim 121 thereof by means of a stationary conical cap 125 overlying the upper side of the wheel, so that the cap and the housing walls cooperate to direct the soap into the slit-like milling orifice between the rim of the wheel and the surface 122 on the stationary milling member 123. Attention is directed to the fact that the walls of the housing and the cap 125 *are both stationary and* converge toward the milling orifice and at the entrance thereto, form the soap into a relatively thin sheet prior to passage through the milling zone.

Hence, the soap to be milled is adapted to be force fed downwardly for travel at a substantial rate through the milling zone as a film-like sheet where the rim of the wheel contacts one side thereof to exert shearing and compacting forces thereon of such an intensity as to effect subdivision and compacting of particles throughout the mass of soap comprising the sheet. The converted soap drops freely from the open bottom of the milling orifice in the form of flakes to be removed by any suitable means.

*It will be noted that the milling and compacting zone, in this case, is annular, and that the perimeter thereof is considerably greater than the perimeter of the outlet 124' of the plodder which may be considered a nozzle discharging into a feed duct 125' defined by the stationary walls of the housing 124 and the cap 125 which leads directly*

*to the milling zone to feed material simultaneously to its entire perimeter. The preforming of the material into a thin annular sheet before it enters the milling zone and comes in contact with the rotating milling surface provided by the rim 121, among other things, has the very important advantage of greatly minimizing the braking effect manifested upon the wheel or rotor 120 by the feed pressure upon the material entering the milling zone.*

In this case also the soap being milled can be aerated, if desired, but since the high speed milling member never leaves the milling zone, it cannot be relied upon to carry air thereinto. Instead, the necessary air for aeration of the soap is brought into the upper portion of the milling zone, under pressure, by means of a series of small orifices 130 in the inner wall of the stationary milling member communicating with an annular header 131 in the inside of the member 123 and supplied with air under pressure by one or more air lines 132. The air introduced into the milling zone in this manner will thus be occluded and finely dispersed in the soap passing through the milling zone, by the combined action of the high speed milling wheel and the congestion and aerating grooves 54' in the inner wall of the stationary milling element 123.

The wheel type mill shown will not have the high efficiency of the previous embodiments of the invention, however, since it requires a running seal 127 between the entire rim of the wheel and the underside of the stationary cap [124] *125* at the entrance to the milling zone. This seal may exert, to some extent, a braking action upon the wheel which cannot be avoided and will limit the speed to that at which a satisfactory seal can be maintained.

In this case also, the interior of the annular milling member 123 preferably is water cooled, and cooling channels 128 are provided in the rim of the wheel to be supplied with coolant in any suitable manner.

If desired, milling can take place at opposite sides of the rim of a rotating type conversion mill to achieve greater capacity, as seen in Figure 19a. As here shown, the rim 135 is the exact counterpart of the high speed milling band of the first embodiment of the apparatus, and has concentric inner and outer cylindrical high speed milling surfaces 136 and 137, respectively, thereon which are slightly spaced from complementary milling surfaces 138 and 139 on stationary inner and outer milling members 140 and 141, respectively.

The lower portion of the rim is detachably joined to a ring 142 which in turn is connected to the hub (not shown) of the wheel by spokes 143 beneath the inner milling member 140. The upper edge portion of the rim, in this case, is received in a groove in an annular separator 144 similar to the separators 36 and 36' of the previous embodiments of the apparatus, and is guided for rotation in said groove.

Soap or other material to be milled is force fed downwardly, as in the Figure 19 embodiment, into and through the spaces at opposite sides of the rim 135, and the converted material discharges adjacent to the lower edge of the rim. To facilitate the discharge of material from the inner milling space, the outer ends of the spokes are preferably blade shaped, as at 146, so as to forcefully eject the milled material during and despite high speed rotation of the wheel.

In this case also, the stationary milling members can be provided with aerating and congestion grooves 147 in their opposing surfaces; and air under pressure can be introduced into the milling spaces through small orifices 148 in the opposing walls of the stationary milling members so as to achieve occlusion and fine dispersion of the air in the soap or other material being milled by the combined action of the high speed rim and the aerating and congestion grooves 147.

Another modification of the band mill especially suited for small scale applications such as a coffee grinder, consists of using a reciprocating motion imparted to the band by a counterbalanced high speed drive using any standard transfer mechanism with straight line path.

From the foregoing it will be apparent that this invention provides a method and apparatus for cold milling soap (and other materials) to produce a product either aerated or deaerated, more completely converted, and having much greater viscosity, or hardness, than was hitherto possible with conventional cold milling apparatus, and wherein:

1. An improved routing of material being processed carries it across the path of the high speed milling band to greatly increase the capacity of the system and permit a greater intensity of conversion without developing destructive heat;

2. The high speed milling band is substantially completely unburdened of all that work which is related to the feeding function, transporting of material through apparatus, and the discharging function for removing the converted material. This removal of work from the high speed milling band by providing separate feeding and discharging means independent of the band has greatly increased the capacity and intensity in the conversion zone;

3. The aeration function resulting from gas entrainment by the high speed milling band has been augmented by force feeding the congestion grooves in the walls of the milling slot, thereby making it possible to open the slot on the discharge side of the milling zone without losing the aerating feature of the process. Such opening of the milling zone provides accessibility for the additional use of drying or cooling air blasts when desired and also permits the use of either a closed or open system;

4. The removal of nearly all of the finished converted product from the milling zone before the product can be carried and swept down to the stripping knives has simplified the band cleaning or stripping function of these knives;

5. The metered flow and directed feed of the input material to both sides of the high speed milling band has made it possible to reduce the clearance between the sides of the band and the walls of the milling orifice to such a degree that the field of application has now been extended to emulsoids or liquid and pasty materials. Also with the closer clearances possible, the heat transfer coefficient in the intensified shearing and compacting zone has been improved and enables the use of low temperature coolants to refrigerate the material being processed. The metered feed also improves the system for handling powdered or granular materials such as synthetic detergents with their builders, very low moisture soaps, and wheat flour. Even abrasive powders can now be milled with a minimum of erosion of the machine parts; and 6. The cross feed arrangement enables the use of a considerably elongated feed and milling zone together with a guide means for the milling band and a metering means for the regulation of the feed of material through the milling zone. Consequently, the system has a very high throughput capacity without sacrificing the effectiveness of extremely close clearances between the band and the walls of the milling orifice so as to preserve the best particle reduction, particle compacting and heat removal conditions in the milling and conversion zone.

What we claim as our invention is:

1. The method of milling deformable solid material having a crystalline phase, to increase the viscosity and/or hardness of said material, which method comprises: applying pressure upon the material and by said pressure continuously forcing the material in one direction into a space between closely adjacent parallel wall surfaces of substantial area for passage through said space and at the same time forming the material into a thin sheet of substantial area; forcing the thin sheet of material in the same direction through and from said space; and rapidly moving the parallel wall surfaces with respect to one another in a direction crosswise to that in which the material travels through the space between said parallel wall surfaces to thereby effect relative motion between the surface layers of the sheet of material in said space, throughout the entire area thereof.

2. The method of milling deformable solid material having a crystalline phase, to increase the viscosity and/or hardness of said material, which method comprises: applying pressure upon the material and by said pressure continuously forcing the material in one direction into a space between closely adjacent parallel wall surfaces of substantial area for passage through said space and at the same time forming the material into a thin sheet of substantial area; forcing the thin sheet of material in the same direction through and from said space; rapidly moving the parallel wall surfaces with respect to one another in a direction crosswise to that in which the material travels through the space between said parallel wall surfaces to thereby effect relative motion between the surface layers of the sheet of material in said space, throughout the entire area thereof; and abstracting heat from the material passing through said space to prevent a temperature rise therein above the crystalline reversion point of the material.

3. The method of milling and aerating viscous material, which comprises: force feeding the material through a slit-like extrusion orifice having its discharge end open to the atmosphere and which defines a shearing and compacting zone, to form the material into a film-like sheet in said zone; imparting motion to the surface layer of material at one side of the sheet crosswise of the travel of the sheet through said zone relative to but substantially parallel with the surface layer of material at the opposite side of the sheet, and high speed internal churning motion to the mass of the material comprising said sheet, so as to effect subdivision and compacting of particles throughout the mass of the material comprising said sheet; and introducing a gas into said shearing and compacting zone for occlusion and fine dispersion of the gas in the material by the churning thereof along with the shearing and compacting forces acting upon the material.

4. The method of milling viscous material to refine and aerate the same, which comprises: moving a mass of deaerated material to be milled and aerated through a feeding zone toward a shearing and compacting zone; forming the material leaving said feeding zone into a film-like sheet; force feeding said sheet edgewise through the shearing and compacting zone; bringing a thin film of air into contact with the surface layer of material at one side of the sheet in said zone; and imparting high speed motion to said surface layer of material in the shearing and compacting zone relative to but substantially parallel with the surface layer of material at the opposite side of the sheet, crosswise of the travel of the sheet through said zone, and high speed internal churning motion to the mass of the material comprising said sheet, so as to effect subdivision and compacting of particles throughout the mass of material comprising said sheet and occlusion and fine dispersion of the air in the material by the churning thereof along with the shearing and compacting forces acting on said material.

5. The method of milling and aerating viscous material, which comprises: forming the material into the shape of a film-like sheet; force feeding a plurality of such sheets edgewise in one direction through a shearing and compacting zone with the sheets in side-by-side parallel relationship; introducing air into said zone; and in said zone imparting high speed motion to the surface layers of material at the inner sides of the sheets relative to and substantially parallel with the surface layers of material at the outer sides of the sheets, crosswise of said feed direction, and simultaneously effecting high speed internal churning of the mass of material comprising each of said sheets so as to effect subdividing and compacting of particles throughout the mass of material comprising each sheet, and occlusion and fine dispersion of air throughout the mass of material comprising the sheets.

6. The method of milling deformable solid material, which comprises: forcibly moving the material to be milled along a predetermined path toward and through a slit-like orifice defining a shearing and compacting zone which is relatively short in the direction of travel of the material; gradually conforming the mass to the shape of said orifice as the material travels along said path; utilizing the force required to move and shape said mass to cause rapid travel of the material through said orifice; and by a separate force imparting motion to the surface layer of material at one side of the film thereof in said orifice, relative to the surface layer of material at the opposite side of the film, in a direction substantially crosswise of the direction in which the material travels through said orifice, and at a speed great enough to effect shearing and compacting of particles in the mass of the material travelling through said orifice.

7. In the method of milling a deformable solid material, the steps of: applying pressure upon the material and by said pressure extruding the material through the narrow dimension of an elongated narrow orifice into a zone having opposite sides of substantial area; and passing a shearing member with opposite faces of substantial area through the material in said zone, centrally thereof, in the direction of the long dimension of said orifice with the opposite faces of said shearing member closely adjacent and parallel to the opposite sides of the said zone and at a high speed so that the combined action of the shearing member and the sides of the zone on the material as it passes through the orifice and through said zone produces intense shearing and compacting forces in the mass of the material to thereby finely mill the same.

8. The method of milling highly viscous solid material, which comprises: forming the material into a sheet not greater than about .015 of an inch in thickness; force feeding said sheet edgewise in one direction, at a rate of at least 200 feet per minute through a slit-like extrusion orifice defining a conversion zone having a length of at least 1 inch in the direction of travel of the sheet; and as the sheet travels through said zone, imparting motion at a rate of at least 1,000 feet per minute to the surface layer of material at one side of the sheet relative to the surface layer of material at the opposite side of the sheet, crosswise of the direction of travel of the sheet through said zone, to effect shearing and compacting of particles in the material throughout the thickness of the sheet.

9. The method of milling and aerating highly viscous solid material which comprises: forming the material into a sheet not greater than about .015 of an inch in thickness; force feeding said sheet edgewise in one direction, at a rate of at least 200 feet per minute, through a slit-like extrusion orifice defining a conversion zone; as the sheet travels through said zone, imparting motion at a rate of at least 1,000 feet per minute to the surface layer of material at one side of the sheet relative to the surface layer of material at the opposite side of the sheet, crosswise of the direction of travel of the sheet through said zone, while violently churning the material internally so as to effect shearing and compacting of particles in the material throughout the thickness of the sheet; and introducing air into said conversion zone for occlusion and fine dispersion of the air in said material by the churning thereof along with the shearing and compacting forces exerted on the material passing through said zone.

10. The method of milling deformable solid material, which comprises: moving a mass of the material to be milled toward a slit-like extrusion orifice defining a shearing and compacting zone; dividing the mass of material approaching said zone into separate relatively thin sheets; rapidly feeding said sheets in spaced apart side-by-side opposing relationship edgewise through said orifice with the surface layers of material at the outer sides of the sheets in intimate contact with the sides of the orifice, and in a direction crosswise of the length of said orifice; and in said orifice, imparting high speed motion simultaneously to the surface layers of material at the inner opposing sides of said sheets, lengthwise of said orifice, so that the combined effect of such motion and the inertia of the mass of the material causes subdividing and compacting of particles in the mass of both sheets.

11. The method of cold milling highly viscous solid material, which comprises: forming the material into a film-like sheet; rapidly feeding said sheet edgewise in one direction through a conversion zone; and imparting extremely high speed motion to the entire surface layer of material at one side of the sheet in said zone as the sheet passes therethrough, crosswise of said feed direction, while utilizing the inertia of the mass of material comprising said sheet to resist such motion so as to effect extremely high relative motion between the surface layers of material at the opposite sides of the sheet and thus produce fine subdivision and compacting of particles in the mass of material comprising said sheet.

12. The method of milling deformable solid material, which comprises: forming the material to be milled into a film-like sheet; force feeding said sheet in one direction through a shearing and compacting zone in which the sheet is constrained to edgewise travel; imparting high speed motion to the surface layer of material at one side of the sheet as it travels through said zone, crosswise of said feed direction, relative to but substantially parallel with the surface layer of material at the opposite side of the sheet; and congesting the material adjacent to said opposite side of the sheet at spaced areas thereof in the shearing and compacting zone so that the combined action of such congestion and the high speed motion of said surface layer of material effects subdividing and compacting of particles in the mass of material comprising said film.

13. The method of milling viscous material to refine and aerate the same, which comprises: moving a mass of the material to be milled through a feeding zone toward a slit-like extrusion orifice defining a shearing and compacting zone; force feeding the material leaving said feeding zone in one direction through said shearing and compacting zone to form the material into a film-like sheet; bringing a thin film of air into contact with the surface layer of material at one side of the sheet passing through said zone; imparting high speed motion to said surface layer of material as the sheet moves through the shearing and compacting zone, crosswise of said feed direction, relative to but substantially parallel with the surface layer of material at the opposite side of the sheet; and congesting the material adjacent to said opposite side of the sheet at spaced areas thereof in said shearing and compacting zone, so that the combined action of such congestion and the high speed motion of said surface layer of material produces subdividing and compacting of particles in the mass of material comprising said sheet, and the occlusion and fine dispersion therein of the air brought into contact with said first designated surface layer of material.

14. The method of milling viscous material to refine and aerate the same, which comprises: forcing the material to be milled and aerated through a slit-like extrusion orifice having its discharge end open to the atmosphere, and which orifice defines a shearing and compacting zone, to form the material into a film-like sheet in said zone; imparting high speed motion to the surface layer of material at one side of the sheet as it moves through said zone relative to but substantially parallel with the surface layer of material at the opposite side of the sheet, while simultaneously violently churning the material internally so as to effect subdividing and compacting of particles throughout the mass of the material comprising said sheet; and introducing a gas into said shearing and compacting zone for occlusion and fine dispersion of the gas in the material by the churning thereof along with the shearing and compacting forces acting upon the material.

15. Milling apparatus, comprising: a movable milling element constrained to travel in one direction along a predetermined path and having an elongated milling surface thereon of substantial area; a stationary milling element having an elongated complementary milling surface thereon of substantial area in juxtaposition to but spaced slightly from said surface on the movable milling element; means for driving said movable milling element at high speed; stationary guide means for directing material to be milled in a direction crosswise of the path travelled by the milling surface on the movable milling element, and into the space between said surfaces on the stationary and movable elements; and feed means communicated with said guide means for forcing material to be milled under substantial pressure into said guide means and across the space between said surfaces on the stationary and movable milling elements.

16. The apparatus set forth in claim 15 further characterized by the fact that said stationary milling element has a series of spaced apart congestion grooves therein opening to and extending across said milling surface thereon, through which material passes as it is forced through the space between the stationary and movable milling surfaces.

17. Milling apparatus comprising: an elongated movable milling element having opposite sides providing movable milling surfaces of substantial area; means mounting and constraining the movable milling element to movement along a defined path which extends lengthwise of said element; stationary milling elements at opposite sides of the path of the movable milling element having opposite walls providing stationary milling surfaces of substantial area overlying said opposite sides of the movable milling element with a milling clearance therebetween; means for forcibly feeding material to be milled into the milling clearances between the stationary and movable milling elements simultaneously along the entire length thereof for passage through said milling clearances in a direction crosswise to the path of the movable milling element; and means for imparting high speed motion to said milling element.

18. Milling apparatus, comprising: a pair of pulleys rotatable about fixed spaced apart parallel axes; an endless flat band trained over said pulleys to be driven at high speed thereby, with one stretch of the band travelling in a straight path between said pulleys, said band having opposite flat sides defining milling surfaces; an elongated wall at each side of said band having a milling surface facing one flat side of the band and extending lengthwise thereof; means mounting said walls in fixed relation to the pulley axes with said surfaces thereof close to but spaced slightly from the sides of the band, said wall surfaces defining a slit-like shearing and compacting zone therebetween of substantial length measured in the direction of band travel therethrough but relatively short in a direction crosswise of band travel; means for feeding material to be milled through said zone, crosswise of the length thereof; and means on said walls near the ends thereof providing seals embracing the band to prevent the material being milled from passing out of the opposite ends of said shearing and compacting zone.

19. Milling apparatus, comprising: a pair of walls each having an elongated milling surface thereon of substantial area; means mounting said walls in fixed spaced apart relationship with said milling surfaces thereof opposite and relatively close to one another, said milling surfaces defining the sides of a slit-like extrusion orifice of substantial length but relatively short in a direction crosswise of said surfaces; an elongated movable milling element having opposite sides defining milling surfaces of substantial area and having a thickness slightly less than the spacing between the milling surfaces defining the sides of the slit-like extrusion orifice; means constraining said movable milling element to travel lengthwise through said extrusion orifice with the opposite sides of the movable element spaced slightly from the surfaces defining the sides of said orifice; means fixed with relation to said walls defining a feed nozzle opening to said extrusion orifice along the entire length thereof adjacent to one side edge of said movable milling element, through which material to be milled is adapted to be forced for travel through said extrusion orifice crosswise of the long dimension thereof; and means for imparting high speed motion to said movable milling element.

20. Milling apparatus, comprising: a pair of walls each having an elongated straight milling surface thereon of substantial area; means mounting said walls in fixed spaced apart relation with said milling surfaces thereof opposite and relatively close to one another, said surfaces defining the sides of a straight slit-like extrusion orifice of substantial length but relatively short in a directic.. crosswise of said surfaces; an endless milling band having opposite sides providing milling surfaces of substantial area and having a thickness slightly less than the spacing between said surfaces which define the sides of the slit-like extrusion orifice; means constraining said band to travel lengthwise through said extrusion orifice with the opposite sides of the band spaced slightly from the milling surfaces defining the sides of said orifice; means at the opposite ends of said walls defining pressure seals closely embracing said band; means fixed with relation to said walls providing a feed nozzle opening to said extrusion orifice along the entire length thereof between said seals and adjacent to one side edge of the band, through which material to be milled is adapted to be forced for travel through said extrusion orifice crosswise of its long dimension; and means for driving said band at high speed.

21. The milling apparatus set forth in claim 20 further characterized by the provision of means for forcing material to be milled through said extrusion nozzle and consequently through said slit-like extrusion orifice.

22. The milling apparatus set forth in claim 21 wherein said means for forcing material to be milled through the feed nozzle comprises a screw rotatable inside the feed nozzle.

23. The milling apparatus set forth in claim 19 further characterized by the provision of separator means fixed with relation to the feed nozzle and extending along the entire length of the extrusion orifice adjacent to the discharge opening in the feed nozzle for directing material to be milled to the opposite sides of the movable milling element and for metering the flow of material into said extrusion orifice.

24. The milling apparatus set forth in claim 23 further characterized by the provision of a series of relatively small teeth extending from the opposite sides of said separator means and spaced apart along the entire length thereof for effecting shredding of the material prior to entrance thereof into said milling orifice.

25. Milling apparatus, comprising: an elongated feed nozzle having a discharge opening in its side extending substantially the entire length of the nozzle; stationary milling means fixed to said side of the feed nozzle and having elongated spaced apart opposing walls the surfaces of which define a slit-like extrusion orifice extending the full length of said discharge opening in the nozzle and in open communication therewith, so that material discharging from the feed nozzle travels through said orifice crosswise of the long dimension thereof; an endless metal movable milling band guided for lengthwise travel through said orifice, said band having a thickness slightly less than the spacing between the surfaces defining the sides of the extrusion orifice so that material forced through the orifice will be brought into intimate contact with the sides thereof and with the opposite sides of the band; means for driving the band at high speed to effect shearing and compacting of particles in the mass of material passing through the milling orifice; means fixed with relation to said walls providing an elongated chamber at the outlet side of said orifice communicating therewith along its entire length and into which the milled material is adapted to be received, said chamber having an outlet opening adjacent to one end thereof; and means inside said chamber for conducting milled material therein toward and through said outlet opening.

26. The milling apparatus set forth in claim 25 further characterized by the provision of aerating and congestion grooves in said walls extending across said surfaces thereof which define the sides of the extrusion orifice for effecting high speed churning of the mass of material passing through said orifice along with occlusion and fine dispersion of air, brought into the orifice by the band, in the material being milled.

27. The milling apparatus set forth in claim 25 wherein said receiving chamber is connected in air-tight relationship with said extrusion orifice; and further characterized by the provision of means on said receiving chamber for restricting the outlet opening therein so as to cause milled material to accumulate in the outlet end of the chamber and thus close off the interior of the chamber from the atmosphere.

28. Milling apparatus, comprising: an annular stationary milling element having an inwardly facing annular milling surface; a wheel rotatable inside said annular milling element and having a rim provided with an annular surface facing said surface on the annular element and spaced from but closely adjacent thereto, said space defining [a shearing and compacting zone for material to be milled; means at one side of the wheel for force feeding material to be milled into and through said space between the surfaces on the rim and the annular element; and means for rotating said wheel at high speed] *an annular shearing and compacting zone having a narrow annular inlet; a pair of complementary stationary walls cooperating with one another to define a feed duct having an inlet and an annular outlet connected directly to the annular inlet of the shearing and compacting zone; means for force feeding material to be milled to and through said feed duct and directly into the annular shearing and compacting zone; and means for rotating said wheel.*

29. The milling apparatus set forth in claim 28 further characterized by the provision of: means on said annular element for introducing air under pressure into said shearing and compacting zone; and said annular element having spaced grooves opening to said surface thereon and extending thereacross substantially in the direction of travel of material through the shearing and compacting zone [, for congesting the material passing through said zone and for producing high speed churning in said material to effect occlusion and fine dispersion of air throughout the mass of the material milled].

30. Milling apparatus, comprising: a rotatable wheel having spokes and a rim carried thereby, said rim being in the shape of a cylindrical wall extending from one side of the wheel, the inner and outer sides of said wall providing cylindrical milling surfaces; a pair of stationary milling members, one inside the other outside of said rim, and each having a cylindrical milling surface spaced from but facing and close to the adjacent surface of the rim; means for rotating said wheel at high speed; and means connected with said stationary members for force feeding material to be milled into and through said spaces between the rim and the surfaces of the stationary milling members in a direction axially of the wheel.

31. The milling apparatus set forth in claim 30 further characterized by the provision of means on said stationary members for introducing air into the spaces between the rim and said surfaces on the stationary members, said means including a series of small orifices in said members opening to said spaces; and said members having spaced congestion grooves therein opening to said surfaces thereon and extending across said surfaces substantially in the direction of travel of material to be milled through said spaces, for effecting occlusion and fine dispersion of air in the material being milled.

32. Milling apparatus, comprising: a rotor having a rim with opposite annular surfaces of substantial area providing movable milling surfaces; a pair of stationary annular walls each having an annular milling surface of substantial area; means mounting said stationary walls with their annular milling surfaces overlying said annular surfaces on the rim with a milling clearance therebetween; means for force feeding material to be milled into said clearances between the surfaces of the rim and the stationary walls; and means for revolving the rotor at high speed.

33. Milling apparatus comprising: a pair of annular stationary milling elements having facing stationary annular milling surfaces; a rotor having a rim positioned between said stationary milling surfaces and provided with annular milling surfaces facing said stationary annular milling surfaces with a milling clearance therebetween; *stationary* walls defining a feed passage leading to said milling clearances; means for feeding the material forcibly through said feed passage and into said milling clearances; and means for rotating the rotor at high speed.

34. Milling apparatus comprising: complementary inner and outer stationary substantially conical walls spaced apart a distance which decreases toward the outer edges of said walls, defining an annular feed passage having an inlet at its center where the space between said walls is greatest and an outlet at the periphery thereof where the space between said walls is least; stationary opposed annular walls joined to the peripheries of said substantially conical walls and defining a milling zone therebetween to which the outlet of the feed passage leads; a rotor having a rim disposed in said milling zone with opposite faces of the rim overlying said opposed annular walls with a milling clearance therebetween; means for forcing material to be milled through the feed passage and into the spaces between said overlying surfaces of the rim and said opposed annular walls; and means for revolving the rotor.

35. *Milling apparatus for milling deformable solid materials such as soap in the solidified state, comprising: complementary relatively rotatable milling members having opposing closely spaced annular milling surfaces defining an annular milling zone having a narrow annular inlet and an annular outlet; means for effecting relative rotation between said milling members to thereby cause one of said milling surfaces to move circumferentially with respect to the other; and spaced apart opposing stationary walls cooperating with one another to define a feed duct having an inlet through which the material to be milled may enter the duct under the high pressure needed to move material such as soap in the solidified state, and having an annular outlet coextensive with and connected directly to the annular inlet of the milling zone to discharge such material into the milling zone, said walls converging toward one another as they approach the inlet of the milling zone so as to decrease the thickness of the stream of material moving through the feed duct and form it into a thin annular sheet before it reaches the inlet of the milling zone and comes into contact with the relatively rotatable milling surfaces so that only a comparatively light braking effect is manifested upon the relatively rotatable milling surfaces by the feed pressure upon the material entering the milling zone.*

36. *Milling apparatus for milling deformable solid materials such as soap in the solidified state, comprising: a rotatable milling member having an annular milling surface; a stationary milling member having an annular milling surface; means mounting said milling members one within the other with their milling surfaces facing each other in closely radially spaced relation so that said surfaces define an annular milling zone having a narrow annular inlet and an annular outlet; a stationary feed nozzle for the apparatus through which the material to be milled may enter the apparatus in a solid stream under the high pressure needed to move such materials as soap in the solidified state; spaced apart opposing stationary walls cooperating with one another to define a feed passage having an inlet connected to the nozzle to receive material therefrom and an annular outlet coextensive with and connected directly to the annular inlet of the milling zone to discharge such material into the milling zone, said stationary walls converging toward one another as they approach the inlet of the milling zone so as to decrease the thickness of the stream of material moving through the feed passage and form it into a thin annular sheet before it reaches the inlet of the milling zone and comes in contact with the rotatable milling surface so that only a comparatively light braking effect is manifested upon the rotatable milling member by the feed pressure upon the material entering the milling zone; means for forcing material from the nozzle and through said feed passage into the milling zone; and means for rotating the rotatable milling member.*

37. *Milling apparatus for milling deformable solid material such as soap in the solidified state, comprising: a pair of complementary walls cooperating with one another to define a duct capable of withstanding the high pressure needed to move such material and having an inlet of relatively small perimeter and an annular slit-like outlet of considerably greater perimeter whereby material moving through the duct from the inlet to its outlet is transformed from a solid stream of small perimeter into an annular stream of much greater perimeter but small wall thickness; cooperating annular milling members one within the other, said milling members having complementary annular milling surfaces in close proximity to one another to define therebetween an annular milling zone having a narrow annular inlet and an annular outlet, said cooperating milling members and the cooperating walls defining said duct being so disposed with respect to one another that the annular outlet of the duct connects directly with the annular inlet of the milling zone; means for force feeding the material to be milled into the inlet of said duct and through the duct to the inlet of the milling zone; said cooperating milling members being relatively rotatable one with respect to the other; and means for effecting such relative rotation between the milling members.*

38. *The milling apparatus of claim 37 further characterized by the provision of grooves in one of said milling surfaces extending from the inlet of the milling zone toward the outlet thereof.*

39. *The milling apparatus of claim 37 further characterized by the fact that one of said milling members is stationary and the other rotatable; and by the fact that the rotatable milling member revolves within the stationary milling member.*

40. *Milling apparatus for milling deformable solid materials such as soap in the solidified state, comprising: a stator and a rotor, said stator and rotor being disposed one within the other and having complementary annular milling surfaces of substantial area radially spaced apart a short distance so as to define an annular milling zone having a narrow annular inlet and an annular outlet; means for rotating the rotor; means for force feeding material to be milled to the inlet of the milling zone simultaneously along its entire perimeter, including a pair of complementary stationary walls cooperating with one another to define a feed passage having an inlet to receive the material and an annular outlet coextensive with and opening directly to the inlet of the milling zone, said walls converging toward one another as they approach the inlet of the milling zone so that the material being fed to the milling zone is preformed into an annular sheet before it reaches the inlet of the milling zone and comes in contact with the rotor to thereby assure that only a comparatively light braking effect will be manifested upon the rotor by the feed pressure upon the material entering the milling zone.*

DONALD E. MARSHALL.
JOHN A. HARRINGTON.
ROBERT L. CRANE.

References Cited in the file of this patent or the original patent

UNITED STATES PATENTS

| Number | Name | Date |
|---|---|---|
| 206,807 | Waterman | Aug. 6, 1878 |
| 405,177 | Quenehen | June 11, 1889 |
| 1,233,177 | Briggs | July 10, 1917 |
| 1,260,320 | Bulley | Mar. 26, 1918 |
| 1,262,246 | Peiler | Apr. 9, 1918 |
| 1,677,690 | Schaefer | July 17, 1928 |
| 2,295,596 | Mills | Sept. 15, 1942 |
| 2,332,727 | Joyce | Oct. 26, 1943 |

FOREIGN PATENTS

| Number | Country | Date |
|---|---|---|
| 10,470 | Great Britain | of 1904 |
| 309,713 | Germany | of 1918 |

Certificate of Correction

Reissue No. 23,760 December 29, 1953

Donald E. Marshall et al.

It is hereby certified that error appears in the printed specification of the above numbered patent requiring correction as follows:

Column 4, line 68, for "160%" read 160° ; line 70, for "process is" read process in ; column 11, line 6, for "rasing" read raising ; column 13, line 26, for "done" read zone ;

and that the said Letters Patent should be read as corrected above, so that the same may conform to the record of the case in the Patent Office.

Signed and sealed this 23rd day of March, A. D. 1954.

[SEAL]

ARTHUR W. CROCKER,
*Assistant Commissioner of Patents.*